Patented Apr. 6, 1937

2,076,477

UNITED STATES PATENT OFFICE 2,076,477

MORDANT AZODYESTUFFS AND THEIR PRODUCTION

Max Müller, Basel, Switzerland, assignor to the firm Durand & Huguenin S. A., Basel, Switzerland No Drawing. Application December 21, 1934, Serial No. 760,064. In Germany December 27, 1933

7 Claims. (Cl. 260—97)

In my copending application Ser. No. 760,063, there is described a process for the manufacture of mordant dyestuffs according to which an unsulphonated compound of the benzene series $R_3$, containing an easily exchangeable halogen atom, is caused to react with an aminoazo-compound corresponding to the following general formula:

wherein $R_1$ stands for a benzene nucleus containing as substituents a hydroxy- and carboxylic-group in ortho-position to each other and $R_2$ stands for a benzene nucleus which may be substituted, but which does not contain sulpho-, carboxylic- or nitro-groups in ortho-position to the free amino-group.

It is probable that the reaction proceeds in such a way that a halogen hydride is split off and that the phenyl radical resulting from the compound $R_3$ enters the free amino-group of the aminoazo-compound. Thus there are obtained new dyestuffs which yield in chrome printing on cotton reddish-yellow to brown-orange shades having good fastness properties. While the starting materials, the aminoazo-compounds, dissolve in concentrated sulphuric acid with yellow coloration, the new dyestuffs give in concentrated sulphuric acid red-violet to blue-violet solutions.

It has been found that this reaction proceeds smoothly in the case of those compounds in which there is no sulpho-, carboxylic- or nitro-group in ortho-position to the amino-group which enters into reaction.

It has now further been found, that dyestuffs of the same constitution can also be prepared in another way, namely by using as parent material a body of the kind of meta-phenylenediamine-sulphonic acid and by causing same to react with an unsulphonated compound of the benzene series, containing an easily exchangeable halogen atom, for example 2,4-dinitro-1-chloro-benzene, whereby the one of the two amino-groups is substituted, then diazotizing the other amino-group and coupling with an ortho-hydroxycarboxylic acid of the benzene series, such as for example salicylic acid.

Since in a diamino-body the presence of substituents, such as sulpho-groups, influences the two amino-groups so that they are not equivalent, that is to say so that they have differing capacities for reaction, it is possible in most cases to introduce a substituent into one amino-group, whilst leaving the other amino-group free for diazotization and coupling.

It is also possible to substitute one of the two amino-groups of a meta-phenylenediamine compound, for instance by acetylating it, then to introduce the phenyl radical resulting from dinitro-chloro-benzene into the other amino-group, and afterwards to saponify the acetyl-group of the first amino-group in order to free it for diazotization.

Thus it is possible in certain cases to produce by this second process dyestuffs corresponding with the definition hereinbefore given, which cannot be prepared according to the process of the aforesaid co-pending application of the same applicant.

If, for example, 3-nitraniline-4-sulphonic acid is diazotized and combined with salicylic acid and the nitro-group in the dyestuff thus obtained is reduced so that there is produced an aminoazo-compound of the formula:

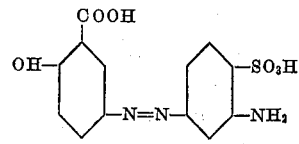

a reaction thereof with 2,4-dinitro-1-chloro-benzene proceeds only with difficulty or not at all, owing to the presence of a sulpho-group in ortho-position to the amino-group.

If, however, the meta-phenylenediaminesulphonic acid

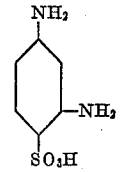

corresponding with 3-nitraniline-4-sulphonic acid and obtained therefrom by reduction is caused to react with 2,4-dinitro-1-chloro-benzene, substitution occurs preferentially in the amino-group having no sulpho-group in ortho-position, whilst the other amino-group remains unsubstituted and can subsequently be diazotized and combined with salicylic acid.

Thus it is possible according to the present process to make a dyestuff in accordance with the given definition from the easily accessible 3-nitroaniline-4-sulphonic acid, whereas this is not possible by the other process cited above.

This invention is illustrated, but not limited by the following example, the parts being by weight.

(a) Condensation of meta-phenylenediaminesulphonic acid and 1-chloro-2,4-dinitrobenzene according to the equation

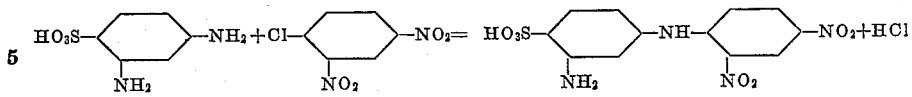

37 parts of meta-phenylenediaminesulphonic acid are intimately triturated in a mortar with 45 parts (=40,4 parts + 10 percent. excess) of 1-chloro-2,4-dinitrobenzene and 60 parts of crystallized sodium acetate and the whole is then mixed with 400 parts of alcohol. The suspension thus obtained is heated in a flask with a reflux condenser for 8 hours. At first the solid matter completely dissolves, but after some time there separates from the solution a yellow-brown precipitate, which after about 8 hours no longer increases in quantity. The reaction mixture is cooled and filtered and the solid matter is dissolved in hot water and the solution is acidified, while still warm, with hydrochloric acid, whereby an intensely light yellow body is precipitated. This body is separated by filtration and washed first with water and then with alcohol in order to remove any unaltered dinitro-chloro-benzene or any dinitro-phenol which may have been formed.

The condensation product thus obtained, which is the free 2,4-dinitro-3'-aminodiphenylamine-4'-sulphonic acid, is an intensely yellow body which is sparingly soluble in cold water, but more soluble in hot water to an orange-yellow solution. Its sodium salt is considerably more soluble in water to an orange solution. The product likewise dissolves in concentrated sulphuric acid to an orange solution.

(b) Diazotization of the condensation product obtained as described in (a) and combination with salicylic acid to produce the dyestuff

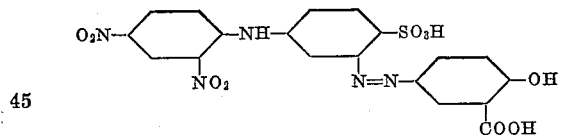

36 parts of the condensation product made as described under (a) are dissolved at a raised temperture in 500 parts of water and about 6 parts of anhydrous sodium carbonate and there are added to the orange solution a solution of 40 per cent strength of sodium nitrite corresponding with 6.9 parts of 100 per cent sodium nitrite. The thinly liquid suspension thus formed is cooled and allowed to run gradually into a solution of 45 parts of concentrated hydrochloric acid and about 150 parts of ice, the temperature being maintained at 10–15° C. There is thus obtained a light yellow, insoluble diazo-compound. After some time this is drained and gradually, whilst still moist, introduced into a solution of 14 parts of salicylic acid, 17 parts of caustic soda solution of 30 per cent strength, 20 parts of anhydrous sodium carbonate and 250 parts of water at a temperature of 10–15° C.

The reaction mass is stirred overnight at ordinary temperature (about 20° C.) and on the following day it is heated to 40° C. and then allowed to cool and acidified. The product which has precipitated is filtered, dissolved as the sodium salt in water containing the required quantity of sodium carbonate, salted out, filtered and dried.

The dyestuff thus obtained is an orange-red powder which dissolves in concentrated sulphuric acid to a red-orange solution. In chrome printing on cotton it yields interesting yellow shades.

There may also be used in this example with similar results instead of the 2,4-dinitro-1-chloro-benzene, picryl-chloride, or dinitro-bromo-benzene. Calcium carbonate, for example, may be used instead of sodium acetate as acid binding agent.

Instead of salicylic acid there may be used in this example homologues and substitution products thereof, such as ortho-cresotinic acid, meta-cresotinic acid, chlorosalicylic acid and others.

Also meta-phenylenediaminesulphonic acid may be replaced by meta-phenylenediamine, chloro-meta-phenylenediamine, meta-tolylenediamine, meta-tolylenediaminesulphonic acid and the like.

What I claim is:—

1. A process for the manufacture of mordant azodyestuffs of the following probable general formula:

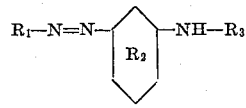

wherein $R_1$ represents a benzene nucleus containing a hydroxy and a carboxylic group in ortho-position to one another, $R_2$ represents a benzene nucleus, bearing—besides an azo- and a NH-group in meta-position to one another—at least one member of the group consisting of hydrogen, methyl, halogen and sulpho, the sulpho group not being in ortho-position to the NH-group, and $R_3$ represents the radical of a nitro-halogen-benzene compound having no sulpho or carboxylic groups, said process consisting in taking a meta-diamino compound of the benzene series, substituted as defined for $R_2$, causing same to react with one molecular proportion of said nitro-halogen-benzene compound containing an easily exchangeable halogen atom, whereby one of the two amino-groups is substituted by $R_3$, diazotizing the other free amino-group and coupling with an ortho-hydroxy-carboxylic acid of the benzene series.

2. A process for the manufacture of mordant azo-dyestuffs of the probable general formula:

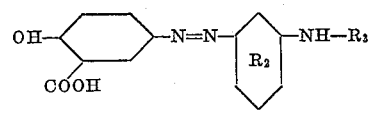

wherein $R_2$ represents a benzene nucleus, bearing—besides an azo- and a NH-group in meta-position to one another—at least one member of the group consisting of hydrogen, methyl, halogen and sulpho, the sulpho group not being in ortho-position to the NH-group, and $R_3$ represents the radical of a nitro-halogen-benzene compound having no sulpho or carboxylic groups, said process consisting in taking a meta-diamino compound of the benzene series, substituted as defined for $R_2$, causing same to react with one molecular proportion of said nitro-halogen-benzene compound containing an easily exchangeable halogen-atom, whereby one of the two amino-groups is substituted by $R_3$, diazotizing the other free amino-group and coupling with salicylic acid.

3. A process for the manufacture of mordant azo-dyestuffs of the probable general formula:

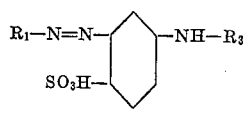

wherein $R_1$ represents a benzene nucleus containing a hydroxy and a carboxylic group in ortho-position to one another and $R_3$ represents the radical of a nitro-halogen-benzene compound having no sulpho or carboxylic group, said process consisting in taking 1,3-phenylene-diamine-4-sulphonic acid, causing same to react with one molecular proportion of a nitro-halogen-benzene compound containing an easily exchangeable halogen atom, whereby one of the two amino-groups is substituted by $R_3$, diazotizing the other free amino-group and coupling with an ortho-hydroxy-carboxylic acid of the benzene series.

4. A process for the manufacture of mordant azo-dyestuffs of the probable general formula:

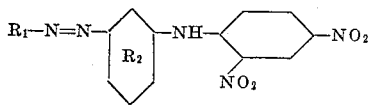

wherein $R_1$ represents a benzene nucleus containing a hydroxy and a carboxylic group in ortho-position to one another, and $R_2$ represents a benzene nucleus bearing—besides an azo- and a NH-group in meta-position to one another—at least one member of the group consisting of hydrogen, methyl, halogen and sulpho, the sulpho group not being in ortho position to the NH-group, said process consisting in taking a meta-diamino compound of the benzene series, substituted as defined for $R_2$, causing same to react with one molecular proportion of 2,4-dinitro-1-chloro-benzene, whereby one of the two amino-groups is substituted, diazotizing the other free amino group and coupling with an ortho-hydroxy-carboxylic acid of the benzene series.

5. A process for the manufacture of a mordant azo-dyestuff of the following formula:

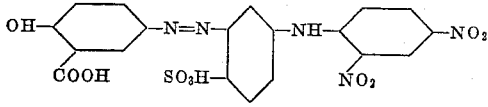

which consists in taking 1,3-phenylene-diamine-4-sulphonic acid, causing same to react with one molecular proportion of 2,4-dinitro-1-chloro-benzene, the one of the two amino groups being substituted thereby, further diazotizing the other amino group and coupling with salicylic acid.

6. Mordant azodyestuffs of the following general formula:

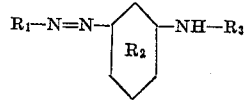

wherein $R_1$ represents a benzene nucleus containing a hydroxy and a carboxylic group in ortho-position to one another, $R_2$ represents a benzene nucleus, bearing—besides an azo- and a NH-group in meta-position to one another—at least one member of the group consisting of hydrogen, methyl, halogen and sulpho, the sulpho group not being in ortho-position to the NH-group, and $R_3$ represents the radical of a nitro-halogen-benzene compound having no sulpho or carboxylic groups, said dyestuffs forming yellow to brown powders being in form of their alkali metal salts soluble in water to yellow or brown solutions, dissolving in concentrated sulphuric acid with red-orange to violet coloration and yielding in chrome printing yellow to brown shades of good fastness properties.

7. The mordant azodyestuff of the following formula:

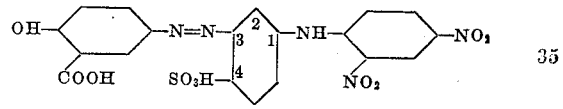

resulting from the action of 2,4-dinitro-1-chloro-benzene upon 1,3-phenylenediamine-4-sulphonic acid, whereby the amino-group in position 1 is substituted from diazotization of the amino group in position 3 and copulation with salicylic acid, said dyestuff forming an orange-red powder being in form of its sodium salt soluble in water, dissolving in concentrated sulphuric acid with a red-orange solution and yielding in chrome printing yellow shades of good fastness properties.

MAX MÜLLER.